Patented Dec. 3, 1968

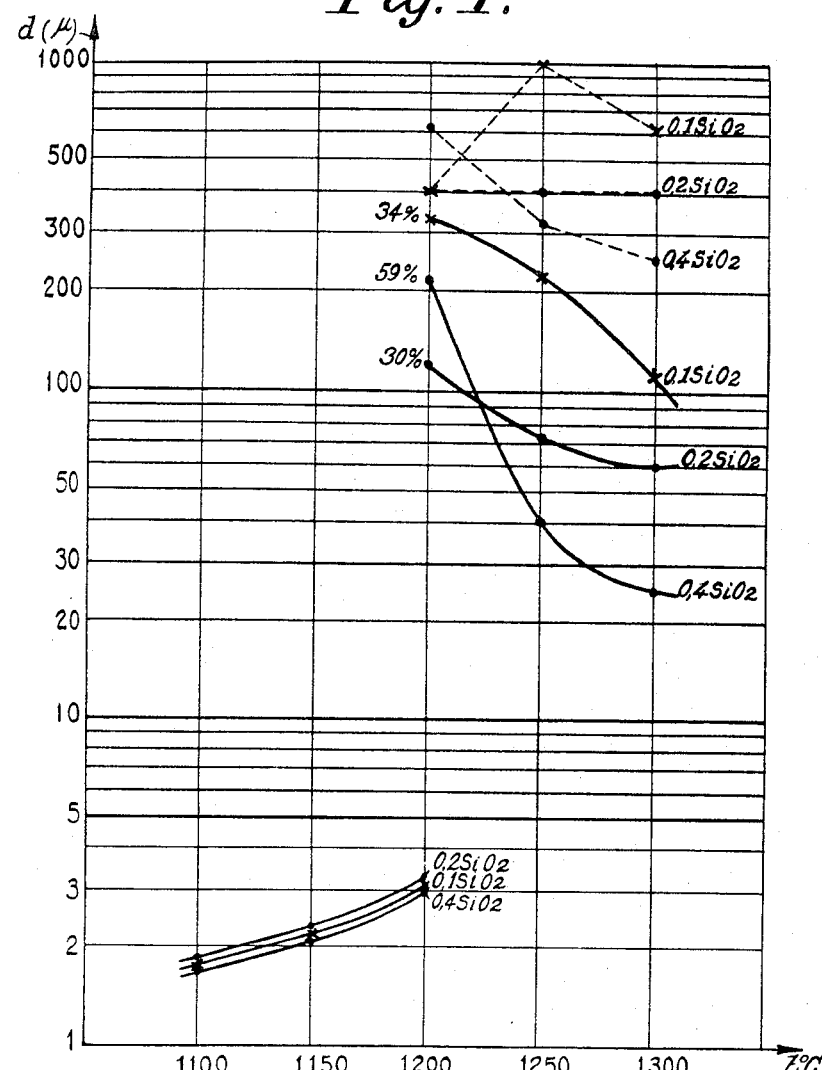
Fig. 1.
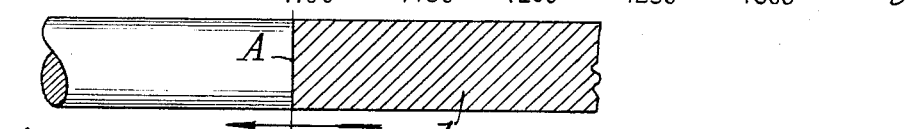
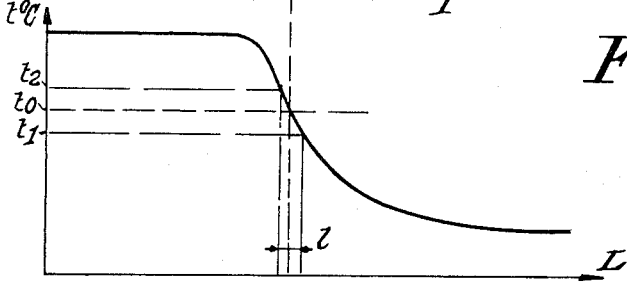
Fig. 2.
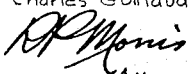
Inventor
Max Paulus -
Charles Guillaud
By R.P. Morris
Attorney

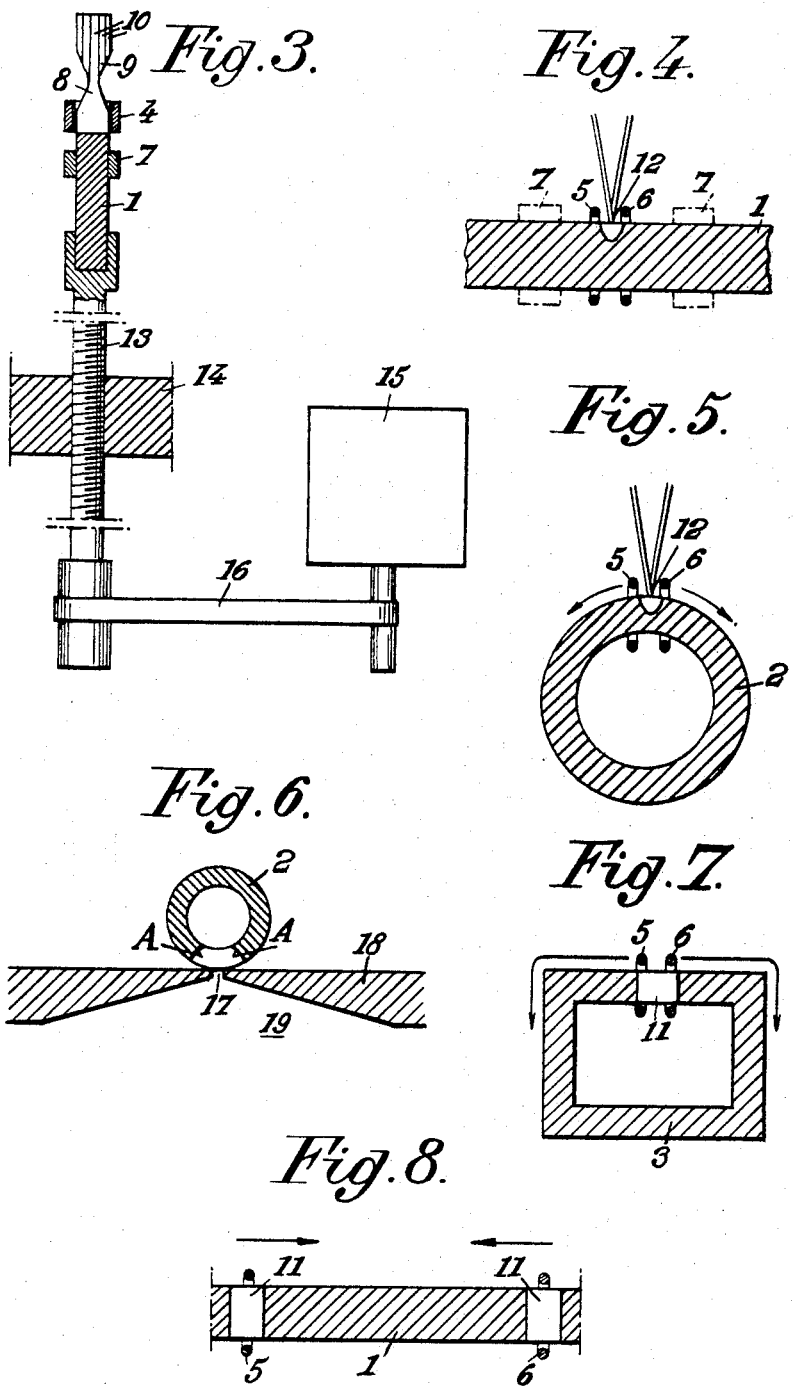

3,414,372
MANUFACTURE OF FERRITE MONOCRYSTALS
Max Paulus and Charles Guillaud, Paris, France, assignors to Centre National de la Recherche Scientifique, Paris, France, a corporation of France
Filed Mar. 26, 1963, Ser. No. 268,173
Claims priority, application France, Mar. 29, 1962, 892,623
7 Claims. (Cl. 23—51)

The invention relates to processes of the kind used to manufacture monocrystals, starting from the polycrystalline aggregate of an initial material, and it concerns more particularly, but not exclusively, those for the treatment of ceramic materials constituted by solid solutions of oxides such as cubic ferrites (ferrospinels) and hexagonal ferrites (hexaferrites), perovskites, garnets and rubies.

Prior systems have been proposed by which single crystals of larger size can be grown by progressive zone heating of a polycrystalline ceramic. These systems require that a zone in the material be heated at least to the melting point. For the solid solutions of oxides very high temperatures are required to melt the material, with or without the addition of a flux. Such systems are described in "Philips Technical Review" No. 6, pages 161–166, and an article by F. W. Harrison, "Research," vol. 12, pages 395 through 403.

Such large single crystals are useful in various microwave devices and in lasers.

The main object of this invention is to render these processes such that the solid state of the initial material is maintained throughout all the phases of the treatment.

The invention profits from the phenomenon according to which certain finely divided substances distributed throughout the matter of the polycrystalline aggregate limit the growth of crystals when this matter is heated, to the extent that such substances do not enter into solid solution in the network of the said matter. Above the temperature of these substances entering into solution in the network some crystals grow abnormally in dimensions to the extent to which the said substances enter into solid solution.

The invention consists, principally, in distributing in small proportion in the matter of the polycrystalline aggregate a finely divided substance whose temperature of entering into solution in the said material (called hereinafter "critical temperature"), is higher than the temperature of formation of this material, this substance being such that on the one hand it provokes a discontinuity in the development of crystals at its critical temperature (in slowing down this development below the said temperature and in accelerating it above the latter) and on the other hand that it is compatible with the crystalline network of the aggregate and again finally that it remains solid at the critical temperature; in forming with this matter added to the said substance an elongated rod; in submitting the said rod to a heat treatment such that the temperature of the said rod passes, in a very small longitudinal distance, from a value clearly lower than the said critical temperature to a value clearly greater than the said critical temperature but lower than the melting temperature of the aggregate, the transverse zone of the rod at which the critical temperature rules being called hereinafter "growth front," and in displacing with respect to one another the growth front and the rod, along the length of the latter at a speed at most equal to the speed at which the said heat treatment transforms the polycrystalline aggregate into monocrystal.

The invention consists, apart from this principal disposition, in certain other dispositions which are preferably used at the same time and which will be more explicitly described hereinafter. It envisages more particularly certain modes of application as well as certain modes of realization of the said dispositions; and it envisages more particularly still and as new industrial products, monocrystals manufactured with the help of the process according to the invention.

It will be able fully to be understood with the help of the complementary description which follows, and also of the accompanying drawings, which complement and drawings are given as indications.

FIG. 1 of these drawings is a diagram allowing the critical temperature of an additional substance to be determined for a polycrystalline aggregate of given composition.

FIG. 2 illustrates schematically the conditions of the process according to the invention.

FIGS. 3 to 8, lastly show schematically different apparatus serving to put the invention into practice.

Pursuant to the invention, and more particularly pursuant to those modes of application, as well as pursuant to those modes of application of its different parts, it appears that preference should be accorded to the proposal to transform into a monocrystal a polycrystalline ferrite aggregate and more particularly a cubic ferrite and this proceeds as follows or in an analogous fashion.

Before describing the process, the manner in which the conditions of this process are determined will be made clear.

Considering, for example, the case of a manganese zinc ferrite prepared by heating for four hours in an atmosphere of nitrogen containing 1% by volume of oxygen a finely milled mixture of 52.5% mol. of $Fe_2O_3$, 28.3% mol. of MnO and 19.2% mol. of ZnO. Several specimens are prepared by adding to this initial mixture, or to the powder obtained by milling the ferrite prepared by sintering this mixture, different proportions of silica ($SiO_2$), these proportions being, for example, 0.1, 0.2 and 0.4 mol. percent related to the totality of the three other constituents, and by heating these specimens to different temperatures.

As shown in the diagram of FIG. 1, temperatures in degrees centigrade (° C.) to which the said mixture (or powder) containing silica is heated are shown abscissae and a parameter depending upon the diameter $d$ of the crystals in microns, shown as ordinate whatever may be the content in silica. There is noted, for the same initial mixture, a discontinuity in the size of the grains at the same temperature of 1200° C. which corresponds to the entry of the silica into solution in the crystalline network of the manganese zinc ferrite. This discontinuity is advantageously put in evidence by choosing for the said parameter, the mean of the diameters of the crystals (that is to say the crystal diameter such that 50% of the crystals have a smaller diameter and 50% have a greater diameter). This mean has been shown in full line in FIG. 1. It is noted, with the chosen example, that at the temperature of 1200° C. the mean of the diameters passes from about 3 microns to about 350 microns for a content of 0.1% of silica; it is this value of 1200° which represents the critical temperature defined above. In a general manner all the temperatures are indicated in centigrade degrees.

On the diagram of FIG. 1 there is equally indicated for the temperature of 1200° the volumetric percentage of the large crystals for each content of silica. Lastly, there is indicated, by interupted line curves, the maximum diameter of the grain for the above indicated three proportions of silica.

The temperature of entering into solution is not a parameter inherent in the inclusion but depends on the composition of the polycrystalline aggregate. Thus for a manganese ferrite prepared with the help of a mixture containing 50% mol. $Fe_2O_3$ and 50% mol. MnO and heated in nitrogen containing 1% by volume of oxygen, the critical temperature is 1225°, while for a nickel-zinc ferrite prepared with the help of an initial mixture of 49.5% mol. $Fe_2O_3$, 15% mol. NiO and 35.5% mol. ZnO and heated in oxygen the critical temperature is 1300°.

To realize the process according to the invention it is expedient first to determine the nature of the substance to be included in the polycrystalline aggregate. For that, it is necessary that this substance produces in the aggregate a discontinuity in the size of the crystals as a function of temperature which is like that of FIG. 1. It is preferred that this discontinuity be such that the ratio between the diameters of the crystals after and before the critical temperature be at least 20 or at best 100. For example, if FIG. 1 be considered, it is noted that the ratio in question is of the order of 100 for a content of 0.1% mol. in silica, which is an optimum value.

It results from the preceding that silica is suitable according to the invention as a substance for inclusion in manganese zinc ferrites.

In return, if for a given initial material, there is not found the formation of large crystals in the range of temperature of the trials with a particular substance for inclusion, two cases are to be envisaged:

First, the inclusion has passed into solid solution at very low temperature and the growth of crystals of the aggregate is identical with that of the aggregate of the same composition but without the inclusion. The inclusion is not suitable and it is then necessary to choose another one. In particular, in the case in which an oxide is chosen as inclusion, it is necessary to replace the oxide by an oxide having a higher heat of formation.

Secondly, the inclusion has not yet passed into solution at the highest temperature used in the trials. In this case, the crsytals of the aggregate are smaller than in the absence of the inclusion. It is necessary to reheat the aggregate to a higher temperature or, if that is not possible to choose an inclusion (notably an oxide) with a lower heat of formation.

The choice of the inclusion having been made and the temperature of entering into solution being known, the minimum content of the inclusion is chosen that makes this discontinuity in the size of the crystals to appear, in such manner as to modify the least possible the properties of the initial material. For example in the case of FIG. 1 the content of 0.1% in $SiO_2$ is very suitable. In general the molecular proportion of the inclusion in relation to the totality of the other constituents is between 0.1% and about 1%.

Lastly, there is formed with the initial material and the added inclusion substance, an elongated rod which can be rectilinear as shown at 1 in FIGS. 2, 3, 4 and 8, or curvilinear in closed profile as shown at 2 in FIGS. 5 and 6 or in a nonclosed profile, or lastly polygonal as shown at 3 in FIG. 7. The section of the rod is limited in upper value, by the possibility of determining in the rod a gradient of elevated temperature.

The said rod 1, 2 or 3, is submitted to a heat treatment such that the temperature of this rod passes in a very small longitudinal distance $l$ (FIG. 2) from a value $t_1$ clearly smaller than the said critical temperature $t_0$ to a value $t_2$ clearly greater than this critical temperature but lower than the melting temperature of the aggregate, the transversal zone A of the rod in which the critical temperature rules being called "growth front."

At the upper part of FIG. 2 there is represented the rod 1, and in the lower part of this figure there is shown as ordinates, on the same scale of abscissae as in the upper part (length L of the rod) the law of variation of temperature $t$ in the rod. What is said above means that matters are arranged in order to determine between one part immediately before the zone A and another immediately after the zone A an elevated gradient of temperature along the length L of the rod 1.

Lastly, the growth front A and the rod are displaced, one with respect to the other, along the length of the rod, at a speed at most equal to the speed at which the above stated heat treatment transforms the polycrystalline aggregate into monocrystal.

In FIG. 2 it has been assumed that the means of heating used for the heat treatment were fixed and that the rod 1 was displaced in the direction indicated by the arrow, but it is clear that the rod could be fixed and the heating means displaced in the direction opposite to that of the said arrow, as will be, besides, explained in detail hereinafter.

The more finely divided the inclusions, the more they are active, that is to say the smaller is the necessary content of the inclusion. The temperature of entering into solution can even be lowered by a lessening of the dimensions of the grains of the inclusion. It is then of interest to give these inclusions the smallest possible dimensions, in particular of several tens to several hundreds of angstrom units. This value is to be compared with those of the crystals of the aggregate which are of the order of a micron.

As substance of inclusion there is chosen by preference an oxide which dissolves in the crystalline network of the initial material at a temperature sufficiently high (notably of the order of 1200° to 1450°) as to have a sufficiently high speed of growth of the monocrystal. To this end, there is a choice of two solutions:

(a) Introduce into the initial mixture an inclusion whose components, because of their ionic radius and of their valency, only pass into solution because of an important thermic agitation. These components will precipitate in the monocrystal in the course of cooling, and in particular in the form of a more or less complex oxide in the case of a ferrite or analogous material.

(b) Choose a very stable inclusion whose network is only destroyed at high temperature, with passage of the components into solution in the initial material. This solution is more advantageous for it allows of monocrystals free from precipitates to be obtained. That is why, in the case of ferrites, it is suitable to choose elements of addition among oxides of high heat of formation on condition that they remain in the solid state at the critical temperature.

For the manufacture of ferrite monocrystals the technician can choose inclusions according to the composition of the basic ferrite and according to the desired critical temperature, from the following list of metallic oxides, this list however not having a restrictive character: silicia, lanthanum oxide $La_2O_3$, neodymium oxide $Nd_2O_3$, palladium oxide $Pd_2O_3$, scandium oxide $Sc_2O_3$, aluminum oxide $Al_2O_3$, chromium oxide $Cr_2O_3$, gadolinium oxide $Ga_2O_3$, thorium oxide $ThO_2$, hafnium oxide $HfO_2$, ziroconium oxide $ZrO_2$, titanium oxide $TiO_2$, tantalum oxide $Ta_2O_5$ and niobium oxide $Nb_2O_5$.

Instead of having recourse for the inclusion substance for different cations from those of the initial material, the same cations can equally be used. It is however, necessary in this case to submit the oxide of the cation common to the inclusion and the ferrite to a treatment increasing its stability. For example, always in the case of a ferrite, ferric oxide $Fe_2O_3$ calcined at a very high temperature (of the order 1000° for example) can be used as the inclusion substance while the remainder of the ferric oxide used for manufacture of the ferrite is calcined at a much lower temperature (of the order of 500°, for example).

The temperature gradient in the ferrite rod can be realized by means of one or more electric heating coils, these coils being designated by 4 in FIG. 3 and by 5 and 6 in FIGS. 4, 5, 7 and 8. These coils can function by Joule effect and radiation, also by induction in the ferrite rod, when they are traversed by high frequency current. This latter method provides the advantage of dissipating more calories in the monocrystal than in the polycrystalline aggregate (the crystal boundaries increase considerably the resistance of the ferrite) which has the effect to increasing the temperature gradient in zone A.

But, it is necessary to use a very high frequency generator because of the high resistivity of ferrites.

The energy source should be sufficiently stable to avoid any untimely displacement of zone A. It is, on the other hand, necessary to heat the monocrystalline part of the specimen to a temperature sufficient to avoid a too important absorption of oxygen from the atmosphere of treatment, this absorption generally provoking precipitants.

By reason of the interest there is in realising as high a temperature gradient as possible, the heating means such as the coil or coils 4, 5 or 6 may be associated with cooling means acting at the level of the polycrystalline aggregate, this latter being shown schematically by cross-hatching in FIGS. 2 to 8. Such cooling means can be constituted by a cooling ring 7 (FIGS. 3 and 4) situated at a short distance from the corresponding heating coil and in contact with the rod 1, and these means contribute to forming a plane growth front, which is desirable.

When the matter constituting the polycrystalline aggregate is a ferrite, this aggregate can be constituted by a first heating to sinter the mixture of powdered oxides of each of the cations. It is equally possible, in a single operation, to sinter these oxides with a view to forming the polycrystalline aggregate and to form the monocrystal according to the invention, this last process allowing a stronger gradient of temperature to be obtained. In any way, there is always disposed a polycrystalline aggregate, either initially throughout the length of the rod (case of preliminary sintering) or in a localized zone of the latter (case of the combined sintering and formation of the monocrystal).

Before commencing to displace the growth front A, in relation to the rod of polycrystalline aggregate, it is necessary that the latter presents at the level of the said front and on the major part of the latter, a monocrystalline germ.

To this end, and as shown in FIG. 3 there can be realized in the neighborhood of the end of the rod, a cone 8 (FIG. 3) of suitable solid angle, and the heating can be begun at the summit of this cone. The small transverse section at which the heating begins increases the probability of only developing a single crystal in the length of the rod. Once the germ is sufficiently developed at the summit of the cone 8, it is only required to displace with respect to one another the rod 1 and the heating coil 4 at a suitable speed.

The cone 8 has the inconvenience of reducing the temperature gradient and there is then interest in prolinging it, either by inert material, or by a second inverted cone 9 and a cylindrical part the whole being in the form of an hour glass, in such fashion that, amongst the cylindrical crystals 10, formed beyond the cone 8, a single one continues to be developed after the narrow part situated between cones 8 and 9. This narrow part is given a section substantially equal to that of one of the crystals 10, this section generally corresponding to a diameter of the order of 2 mm.

Another process consists in introducing a monocrystalline germ 11 (FIGS. 7 and 8) occupying all the transverse section of the rod.

A third process consists in using two independent coils 5 and 6 (FIGS. 4 and 5) coaxial to the rod 1 or 2, and a practically point-shaped heating element constituted for example by the top of an electrically heating coil in the shape of a hair-pin. By the help of this heating element, there is instigated a hot point on the surface of the rod 1 and 2, then after development of a monocrystal in the neighbourhood of this hot point, the latter is progressed throughout the whole section of the rod with the help of coils 5 and 6. When the crystal occupies the whole section of the rod, the two coils 5 and 6 are drawn apart at the chosen speed of growth (speed evaluated with respect to a fixed point). This process allows the speed of growth of the monocrystal to be doubled and crystals in the form of a torus (FIG. 5) or of more complex forms to be manufactured.

The displacement of the growth front A is from several tens to several hundreds of microns per hour.

For the manufacture of cylindrical monocrystals with the help of a heating coil 7 (FIG. 3) a micrometric screw 13 engaged in a nut 14 can be used, this screw being rotated at very slow speed by a motor 15 and transmission 16. It is also possible to displace the rod 1 in translation with the help of a hydraulic system, the essential being that the drawing means should be of a nature to communicate to the rod 1 a regular speed of drawing relative to the heating coil 4.

In place of having recourse to mechanical means for displacing the growth front A relative to the rod, purely thermic means may be used. To this end several toroid rods 2 of polycrystalline aggregate may be disposed side by said in a straight slit 17 in insulating material 18 which forms the heart of an oven 19. By progessively increasing the heating temperature, the growth fronts A of placing the inclusion into solution progressively move away from the hot point constituted by the slit 17 and finish by running throughout all the toroid rod which is only then formed into a single crystal.

It is often useful to make monocrystals having a predetermined orientation, for example to realise a monocrystalline frame the directions of easy magnetisation of which are parallel to the arms of the frame. To this end, as shown in FIG. 7 there may be introduced at the moment of formation of the frame, a monocrystal 11 of a suitably oriented ferrite, then, after sintering at a temperature below the temperature of the inclusion entering into solution, develop the monocrystal 11 with the help of two heating coils 5 and 6 displaced as has been indicated above with reference to FIGS. 4 and 5.

The same principle can be used for the manufacture of bicrystals, as FIG. 8 shows, in which case there is introduced, not one germ as in the case of FIG. 7, but two germs which are brought towards one another as is indicated by the arrows of FIG. 8.

The present process of manufacture of monocrystals starting from a polycrystalline aggregate is, in principle, applicable to all ferrites (spinels, hexaferrites) garnets, perovskites, whatever be their composition. According to this process neither a crucible nor melting is used.

The local heating of the specimen needs little power and the apparatus is simple and of small volume.

The temperature of growth of the monocrystal should be clearly below the point of fusion of the ferrite. It is then possible to establish for the formation treatment of the monocrystal a partial pressure of oxygen which is in equilibrium with the dissociation pressure of the ferrite without using an enclosure under pressure.

The manufacture of a monocrystal can be interrupted and taken up again at any time. After a stoppage, it is sufficient to take up the operation at some tens of microns behind the front of entering into solution of the inclusions.

The mass of the inclusion substance is very small, of the order of a thousandth of the total mass. It is possible to manufacture monocrystals of the same composition with different elements of addition for forming the monocrystal, and in consequence to choose the element of addition as a function of the use of the monocrystal. As stated above, there can even be used as an inclusion substance, one of the oxides serving in the preparation of the initial material, on condition that this oxide is submitted to a treatment increasing its stability.

Lastly, the process according to the invention allows of the manufacture, in very similar conditions, of polycrystalline aggregates and of monocrystals of almost identical composition.

By way of indication, there will be given hereinafter different conditions of the process of manufacture of a monocrystal, for a manganese zinc ferrite, prepared starting from the first initial mixture mentioned above, that is to say, a mixture containing 52.5% mol. $Fe_2O_3$, 28.3% mol, MnO and 19.2% mol. ZnO. To this initial mixture there is added 0.1% mol. of silica as inclusion substance. For this composition, the temperature of the start of entering into solution of inclusions is 1200° (see FIG. 1). There is first prepared, by sintering for four hours at 1100° the above indicated mixture, in an atmosphere of nitrogen containing 1% by volume of oxygen, a cylindrical ferrite rod of 50 mm. length and about 5 mm. in diameter. Following the schematic of FIG. 3, this rod is displaced at the speed of 100 microns per hour (or at a little greater speed, notably up to 200 microns per hour in a furnace whose temperature gradient at 1200° is 150° per mm.).

This oven is formed of a cylindrical tube in platinum with 25% of indium, heated by high frequency. The dimensions of this tube are: length 9 mm., internal diameter 6 mm.; external diameter 7 mm.

In these conditions, the monocrystal is developed in the inverse direction of the displacement of the cylindrical ferrite rod.

The same fashion can be proceeded with for ferrites of manganese and of nickel zinc, notably for those which have proportions defined in the preceding and whose temperatures of entering into solution have been indicated.

These same conditions can be maintained in a general manner for other bodies such as hexaferrites, perovskites, rubies and garnets. Thus for a hexaferrite whose initial mixture comprises 84 mol. of $Fe_2O_3$ for 15 mol. of BaO, alumina can be used as an inclusion substance (one molecule for 99 molecules of the two other oxides). In this case, the heat treatment according to the invention takes place in air, the critical temperature being 1325°.

As is clear and as it results besides already from the preceding, the invention is in no way limited to those of its modes of application, nor to the modes of realisation of its different parts having been more particularly envisaged; it embraces, on the contrary, all variants, notably those in which the polycrystalline aggregate shall be constituted by a metal.

What we claim is:

1. A method of producing a ferrite monocrystal from a solid polycrystalline aggregate of an initial material, comprising preparing a mixture constituted by a solid solution of oxides including $Fe_2O_3$ which will form a polycrystalline aggregate at a given temperature, including in said mixture, to form a completed mixture, a finely divided crystal-promoting substance which will not enter into solution at said given temperature but will enter into solid solution at a higher critical temperature below the fusion point of said aggregate and which will tend to promote growth of crystals by producing discontinuity in the size of crystals at said critical temperature, said crystal-promoting substance consisting of a metallic oxide in the form of particles whose dimensions lie between ten and one thousand angstrom units and in an amount between 0.1 and 1.0 molecular percent related to the total of the other constituents, whereby the ratio between the diameters of the crystals after and before the critical temperature is of the order of 20 to 100, heating said completed mixture to said given temperature to form an elongated solid polycrystalline body, thereafter heating a transverse zone of said body which zone incorporates a single crystal to provide a temperature gradient from a temperature below said critical temperature to a temperature above said critical temperature but below said fusion point of the aggregate, whereby said substance enters into solid solution, and progressively traversing said heated zone along said body to promote the growth of a single crystal from said aggregate.

2. A method of producing a single crystal as claimed in claim 1 in which the crystal-promoting oxide has the same cation as one of those oxides used for the preparation of the polycrystalline material, the metal oxide having been submitted to a heat treatment for increasing its stability against entering into solution during aggregation at said given temperature.

3. A method of producing a single crystal as claimed in claim 1 in which the solid polycrystalline aggregate of an initial material is a manganese zinc ferrite and the crystal-promoting substance is silica.

4. A method of producing a single crystal as claimed in claim 1 in which monocrystalline growth is initiated in a small section zone in the elongated polycrystalline body, this zone being constituted by a constriction between two conical portions of the body.

5. A method of producing a single crystal as claimed in claim 1 in which monocrystalline growth is initiated by substituting a separately prepared germ for a section of the elongated polycrystalline body.

6. A method of producing a single crystal as claimed in claim 1 in which monocrystalline growth is initiated by heating a point on the elongated polycrystalline body and then extending the heating to the whole transverse section of the body.

7. A method of producing a single crystal as claimed in claim 1 in which in order to increase the temperature gradient about said critical temperature, heating means are used, followed at a short distance by cooling means.

References Cited
UNITED STATES PATENTS

| | | | |
|---|---|---|---|
| 2,721,950 | 10/1955 | Piper et al. | 23—305 X |
| 2,848,310 | 8/1958 | Remeika | 23—305 |
| 2,941,861 | 6/1960 | Wentoff | 23—305 X |
| 3,026,188 | 3/1962 | Wang | 23—301 |
| 3,027,281 | 3/1962 | Osborn et al. | 23—301 X |
| 3,031,275 | 4/1962 | Shockley | 23—301 |
| 3,075,831 | 1/1963 | Remeika | 23—305 |
| 3,234,135 | 2/1966 | Ballman et al. | 23—305 X |

OSCAR R. VERTIZ, *Primary Examiner.*

H. T. CARTER, *Assistant Examiner.*